US010870394B1

(12) United States Patent
Nania et al.

(10) Patent No.: US 10,870,394 B1
(45) Date of Patent: Dec. 22, 2020

(54) VEHICLE INTERIOR LIGHTING SYSTEM AND METHOD

(71) Applicant: Ford Global Technologies, LLC, Dearborn, MI (US)

(72) Inventors: Adrian Nania, Rochester, MI (US); Stuart C. Salter, White Lake, MI (US); Satyanarayana Raju Vemulapati, Westland, MI (US); Paul Kenneth Dellock, Northville, MI (US); Spencer Monroe Dinkins, III, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/595,567

(22) Filed: Oct. 8, 2019

(51) Int. Cl.
| | | |
|---|---|---|
| *B60Q 3/208* | (2017.01) |
| *F21V 23/00* | (2015.01) |
| *F21V 8/00* | (2006.01) |
| *B60Q 3/53* | (2017.01) |
| *B60Q 3/74* | (2017.01) |
| *B60Q 3/80* | (2017.01) |
| *B60Q 3/62* | (2017.01) |
| *F21W 106/00* | (2018.01) |
| *F21Y 115/10* | (2016.01) |

(52) U.S. Cl.
CPC ............... *B60Q 3/208* (2017.02); *B60Q 3/53* (2017.02); *B60Q 3/62* (2017.02); *B60Q 3/74* (2017.02); *B60Q 3/80* (2017.02); *F21V 23/003* (2013.01); *G02B 6/001* (2013.01); *F21W 2106/00* (2018.01); *F21Y 2115/10* (2016.08)

(58) Field of Classification Search
CPC ............... B60Q 3/80; B60Q 3/62; B60Q 3/74
See application file for complete search history.

(56) References Cited

U.S. PATENT DOCUMENTS

| | | | | |
|---|---|---|---|---|
| 6,095,840 | A | * | 8/2000 | Yamaguchi ........ H01R 13/6315 362/523 |
| 2011/0267833 | A1 | * | 11/2011 | Verrat-Debailleul ........ B60Q 3/208 362/545 |
| 2015/0085519 | A1 | | 3/2015 | Ammar et al. |
| 2015/0291084 | A1 | * | 10/2015 | Gold ........................ B60Q 3/78 362/516 |
| 2017/0305339 | A1 | * | 10/2017 | Lin ........................ G02B 6/0091 |
| 2018/0272931 | A1 | * | 9/2018 | Salter ........................ B60Q 3/68 |
| 2019/0001875 | A1 | * | 1/2019 | Xu ............................ B60Q 3/64 |
| 2019/0135170 | A1 | | 5/2019 | Salter et al. |
| 2019/0176690 | A1 | * | 6/2019 | Park ........................ F21V 29/70 |
| 2019/0184895 | A1 | * | 6/2019 | Oshina .................. B60Q 3/208 |

FOREIGN PATENT DOCUMENTS

| | | | |
|---|---|---|---|
| CN | 207349886 U | 5/2018 | |
| CN | 109733170 A | 5/2019 | |
| DE | 102011103319 A1 | 12/2011 | |
| DE | 202018103669 U1 | * 7/2018 | ............... B60Q 3/53 |

* cited by examiner

Primary Examiner — Eric T Eide
(74) Attorney, Agent, or Firm — David Coppielle, Esq.; Carlson, Gaskey & Olds, P.C.

(57) ABSTRACT

A lighting system for a vehicle passenger includes, among other things, a light emitting conduit disposed about at least a portion of an opening through a vehicle roof. The light emitting conduit includes a push-through retainer that is insertable through an aperture in a vehicle structure to hold the light emitting conduit relative to the vehicle structure.

18 Claims, 4 Drawing Sheets

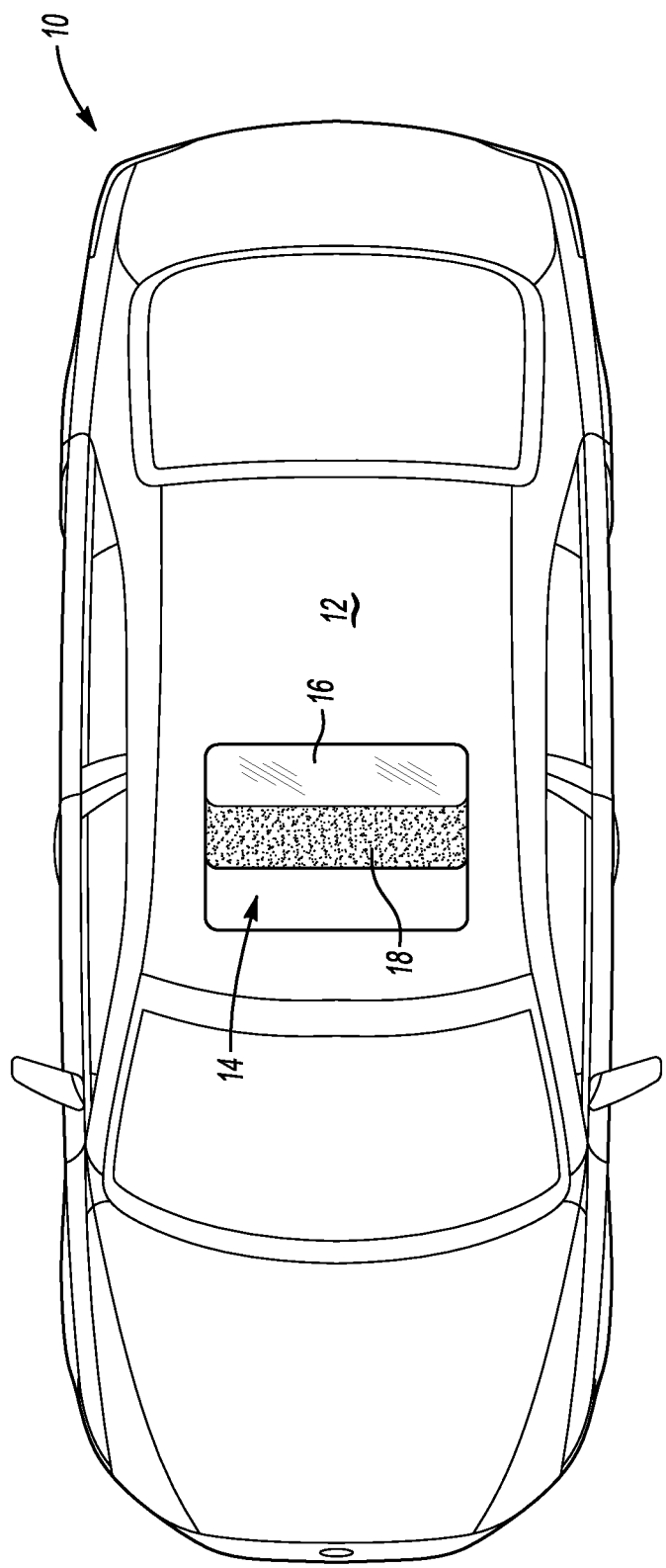
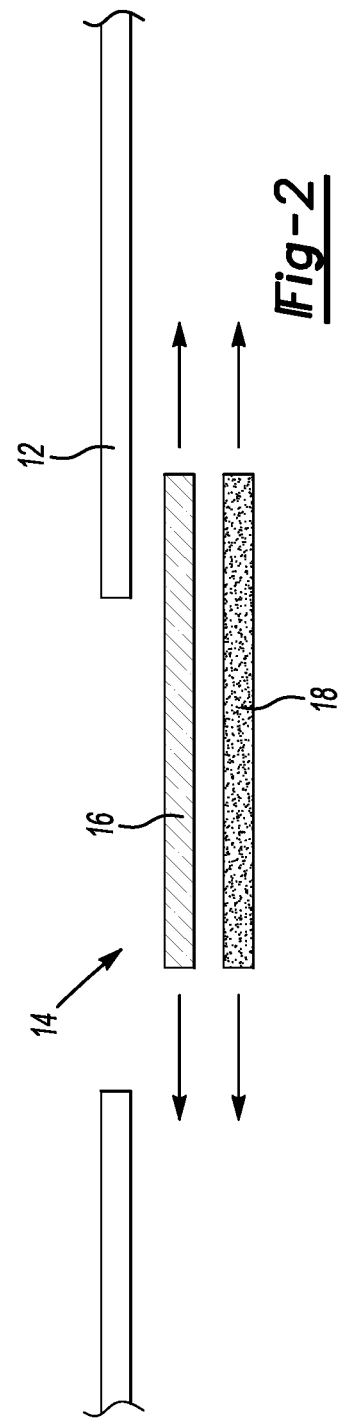

VEHICLE INTERIOR LIGHTING SYSTEM AND METHOD

TECHNICAL FIELD

This disclosure relates to a vehicle interior lighting system disposed about, for example, an opening in a roof of a vehicle.

BACKGROUND

Vehicles may include a roof having an opening. A moveable closure panel, often referred to as a moon roof, can selectively open or close the opening. Lighting about the opening is sometimes included to provide additional lighting within a passenger compartment of the vehicle and to provide a desired aesthetic appearance.

SUMMARY

A lighting system for a vehicle passenger compartment according to an exemplary aspect of the present disclosure includes, among other things, a light emitting conduit disposed about at least a portion of an opening through a vehicle roof. The light emitting conduit includes a push-through retainer. The push-through retainer is insertable through an aperture in a vehicle structure to hold the light emitting conduit relative to the vehicle structure.

In another example of the foregoing lighting system, the push-through retainer has an arrow-head cross-sectional profile.

In another example of any of the foregoing lighting systems, the push-through retainer and remaining portions of the light emitting conduit are portions of a continuous, monolithic structure.

In another example of any of the foregoing lighting systems, the push-through retainer includes an enlarged head on a first side of a vehicle structure. The enlarged head is connected to a light emitting region of the light emitting conduit by a neck portion that extends through the aperture in the vehicle structure.

Another example of any of the foregoing lighting systems includes at least one light source disposed at an end of the light emitting conduit.

In another example of any of the foregoing lighting systems, the light emitting conduit extends longitudinally from a first end to an opposite, second end. The light source includes a first group of light emitting diodes adjacent the first end, and a second group of light emitting diodes adjacent the second end.

In another example of any of the foregoing lighting systems, the light source comprises a plurality of light emitting diodes. At least some of the light emitting diodes are positioned directly adjacent the push-through retainer on a first side of the vehicle structure, and at least some of the light emitting diodes are positioned directly adjacent a light emitting region on an opposite second side of the vehicle structure.

Another example of any of the foregoing lighting systems includes a reflective optic that directs light emitted from the light source from the push-through retainer and the neck to the light emitting region of the light emitting conduit.

In another example of any of the foregoing lighting systems, the reflective optic is molded into the push-through retainer.

In another example of any of the foregoing lighting systems, the reflective optic is a material that is separate from a material of the push-through retainer.

Another example of any of the foregoing lighting systems includes a controller module governing operation of the light source responsive to a position of at least one of a closure panel and shade movable over the opening in the vehicle roof.

In another example of any of the foregoing lighting systems, the controller decreases an intensity of light directed into the light emitting conduit responsive to the shade being in an open position and the closure panel being in a closed position.

In another example of any of the foregoing lighting systems, the controller increases an intensity of light directed into the light emitting conduit responsive to the shade and the closure panel being in an open position.

A lighting system for a vehicle passenger compartment according to another exemplary aspect of the present disclosure includes, among other things, a vehicle roof having an opening, and a retention flange adjacent the opening. The retention flange has a retention aperture. A light emitting conduit is disposed about at least a portion of the opening. The light emitting conduit includes a push-through retainer on a first side of the retention flange, a neck extending through the retention aperture, and a light emitting region on an opposite, second side of the retention flange. The lighting system further includes light sources disposed adjacent a longitudinal end portion of the light emitting conduit. Some of the light sources are positioned directly adjacent the push-through retainer on a first side of the retention flange, and some of the light sources are positioned directly adjacent a light emitting region on an opposite, second side of the retention flange.

Another example of the foregoing lighting system includes a reflective optic that directs light emitted from at least some of the light sources from the push-through retainer and the neck to the light emitting region of the light emitting conduit.

In another example of any of the foregoing lighting systems, the light emitting conduit extends from a driver side of the opening, along a forward side of the opening, to a passenger side of the opening.

In another example of any of the foregoing lighting systems, the push-through retainer has an arrow-head cross-sectional profile.

A method of holding a lighting system for a vehicle passenger compartment according to yet another exemplary aspect of the present disclosure includes, among other things, holding a light emitting portion of a light emitting conduit against a first side of a retention flange of a vehicle using a push-through retainer that is disposed on an opposite, second side of the retention flange. The light emitting portion is connected to the push-through retainer with a neck that extends through an aperture of the retention flange.

In another example of the foregoing method, the retention flange is adjacent an opening of a vehicle roof, and the light emitting portion is disposed about at least a portion of the opening.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 is a top view of a vehicle including an example moon roof embodiment.

FIG. 2 is a schematic side view of an example moon roof embodiment.

DETAILED DESCRIPTION

Figure 3:
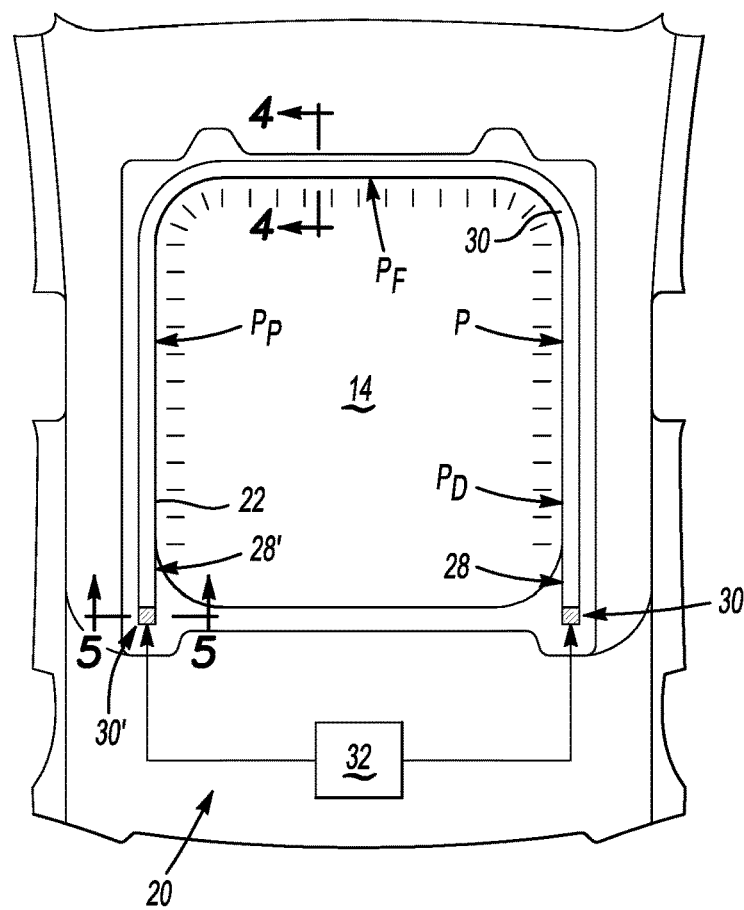
FIG. 3 is a view of the example moon roof of FIG. 2 and an example lighting system embodiment looking upward from the interior of the vehicle.

This disclosure relates generally to a lighting system for a vehicle passenger compartment and, in particular, a lighting system that at least partially surrounds an opening through a roof of a vehicle. The disclosure details, among other things, how the lighting system is attached to other portions of the vehicle.

Referring to FIGS. 1 and 2, a vehicle 10, according to an exemplary aspect of the present disclosure, includes a roof 12 having an opening 14. The vehicle 10 further includes a closure panel 16, which is commonly referred to as a moon roof, and a shade 18. The closure panel 16 and the shade 18 are moveable independently relative to each other and relative to the opening 14 to various positions. In some of the positions, the closure panel 16 can close the opening 14.

Referring now to FIG. 3 with continued reference to FIGS. 1 and 2, a lighting system 20 includes a light emitting conduit 22 disposed about a portion of a perimeter P of the opening 14. The exemplary light emitting conduit 22 is disposed along a driver side $P_D$, a forward side $P_F$, and a passenger side $P_P$ of the perimeter P. Forward, for purposes of this disclosure, is with reference to the general orientation of the vehicle 10.

The example light emitting conduit 22 extends continuously from a first end portion 28 to a second end portion 28'. At least one first light source 30 is disposed adjacent the first end portion 28. At least one second light source 30' is disposed against the second end portion 28'.

In the exemplary embodiment, the light sources 30, 30' each include a plurality of light emitting diodes (LEDs) that can provide light at varying intensities and colors. Although the light sources 30, 30' are disclosed by way of example as LEDs, other light sources may be used and are contemplated within the teachings of this disclosure.

A controller module 32 is shown schematically. The controller module 32 is for controlling operation of the light sources 30, 30'. The controller module 32 can activate the light sources 30, 30' to cause the light sources 30, 30' to emit light. The controller module 32 can also adjust an intensity of light emitted from the light sources 30, 30'.

Light emitted from the light sources 30, 30' is directed into the light emitting conduit 22. The light propagates through the light emitting conduit 22. The light is then emitted from the light emitting conduit 22 to illuminate, among other things, the sides $P_P$, $P_D$, $P_F$ of the perimeter P.

The controller module 32 can, for example, govern operation of the light sources 30, 30' in response to a position of the closure panel 16, the shade 18, or both. For example, the controller module 32 could cause the light sources 30, 30' to increase an intensity of light directed into the light emitting conduit 22 in response to the closure panel 16 and the shade 18 being in an open position. The controller module 32 could also cause the light sources 30, 30' to decrease an intensity of light directed into the light emitting conduit 22 in response to the shade 18 being in an open position and the closure panel 16 being in a closed position.

The controller module 32 can be a dedicated controller for the lighting system 20, part of a vehicle controller, or part of other control systems within the vehicle 10. Further, the location of the controller module 32 is shown schematically and may be disposed in other locations within the vehicle 10.

In the past, lighting systems incorporating light emitting conduits have been secured relative to other portions of the vehicle 10 utilizing a plurality of separate clips. The clips can complicate assembly and increase part complexity.

Figure 4:
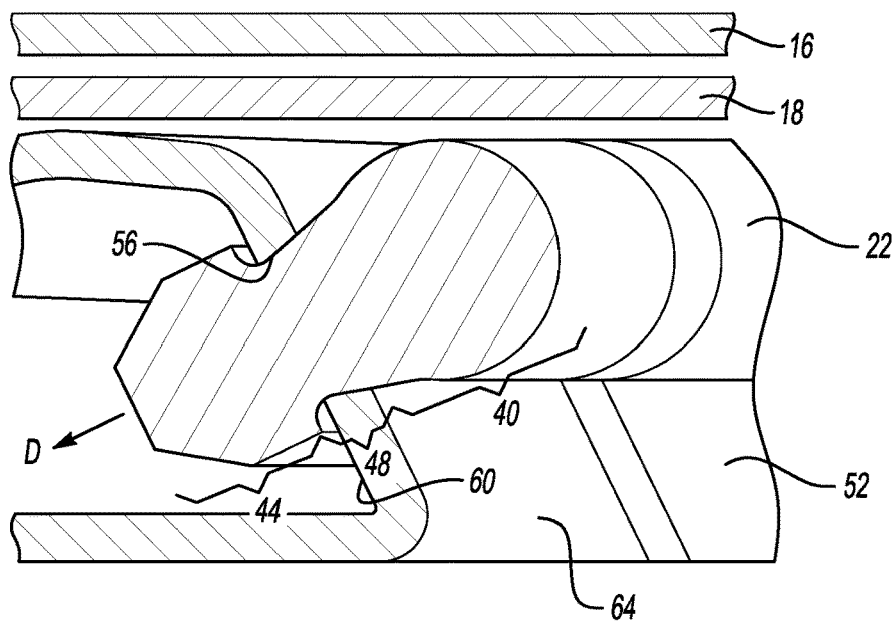
FIG. 4 is a section view taken along line 4-4 in FIG. 3 when the moveable cover and the shade are in a closed position.

Referring now to FIG. 4 with continued reference to FIG. 3, the light emitting conduit 22 includes a light emitting region 40, a push-through retainer 44, and a neck portion 48 that connects the light emitting region 40 to the push-through retainer 44. The light emitting conduit 22 is secured to a vehicle structure 52 to secure the light emitting conduit 22 in the installed position of FIG. 3. The light emitting conduit 22 can be secured without clips in this example.

To move the light emitting conduit 22 to the installed position, the push-through retainer 44 is moved in a direction D through an aperture 56 in the vehicle structure 52. As the push-through retainer 44 moves through the aperture 56, the push-through retainer 44 is compressed laterally relative to the direction D.

After the push-through retainer 44 has moved through the aperture 56 to the position of FIG. 4, the push-through retainer 44 expands laterally outward to the profile shown in FIG. 4.

In the installed position of FIG. 4, the push-through retainer 44 is on a first side 60 of the vehicle structure 52, and the light emitting region 40 is on an opposite, second side 64 of the vehicle structure 52. The neck portion 48 of the light emitting conduit 22 extends through the aperture 56 to connect together the push-through retainer 44 and the light emitting region 40.

As shown, the push-through retainer 44 is an enlarged head relative to the neck portion 48. The enlarged head of the push-through retainer 44 prevents the light emitting conduit 22 from moving from the installed position of FIG. 4. The push-through retainer 44 extends laterally, in the exemplary embodiment, as far as the light emitting region.

The push-through retainer 44 has a cross-sectional profile having an arrowhead shape in the exemplary embodiment. This profile can facilitate insertion of the push-through retainer 44 through the aperture 56, and can further facilitate keeping the light emitting conduit 22 in the installed position of FIG. 4.

The light emitting region 40, the push-through retainer 44, and the neck portion 48 are formed together as a single continuous structure to provide the light emitting conduit 22. The light emitting conduit 22 can be extruded in an exemplary embodiment. In another example, the light emitting conduit 22 can be molded. The example light emitting conduit 22 is a polymer or polymer-based material.

Figure 5:
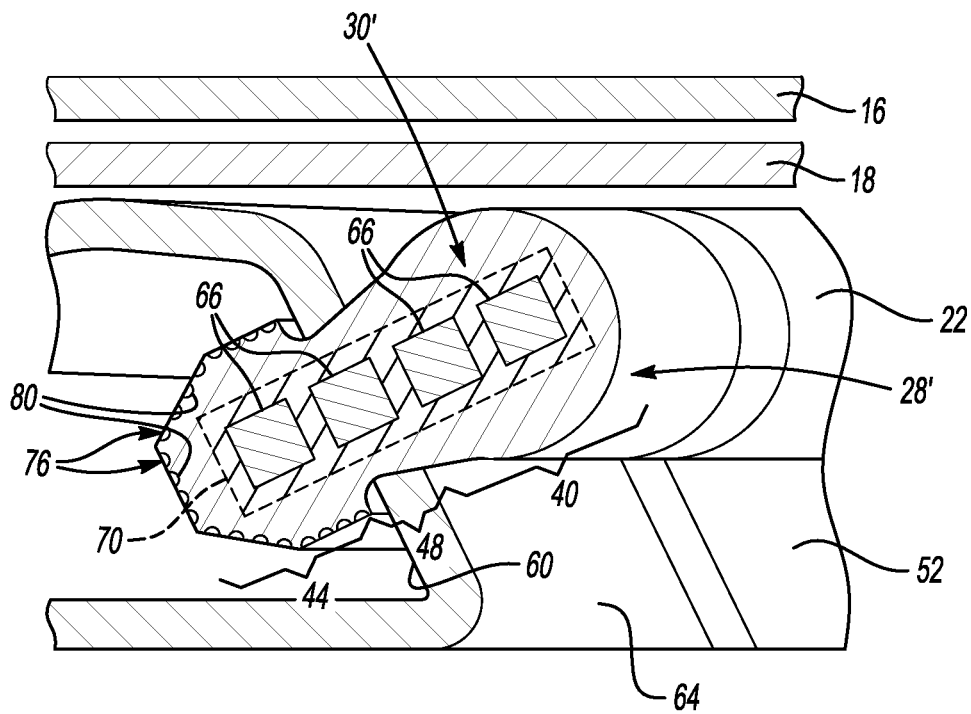
FIG. 5 illustrates a section view taken at line 5-5 in FIG. 3.
Figure 6:
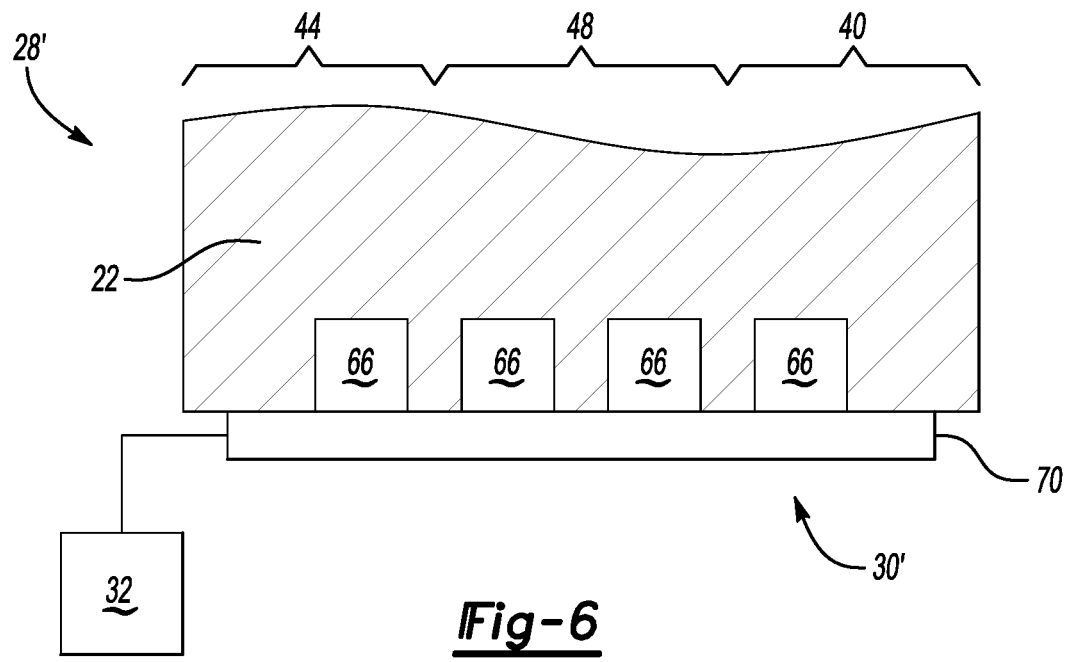
FIG. 6 illustrates a section view through a light source and an end of light emitting conduit of the lighting system of FIGS. 3-5.

With reference now to FIGS. 5 and 6, in the exemplary embodiment, the at least one light source 30' adjacent the second end portion 28' of the light emitting conduit 22 includes a plurality of LEDs 66 disposed on a mounting board 70, such as a two ounce copper printed circuit board. In this example, four LEDs 66 provide the light source 30'. The LEDs 66 are operatively coupled to the controller module 32. The LEDs 66 can be connected in series.

At least one of the LEDs 66 is positioned directly adjacent the push-through retainer 44 on the first side 60 of the vehicle structure 52, and at least one of the LEDs 66 is positioned directly adjacent the light emitting region 40 on the second side 64 of the vehicle structure 52. Another of the LEDs 66 is positioned directly adjacent the neck portion 48. In this example, the LEDs 66 are partially received within the light emitting conduit 22. In another example, the LEDs 66 abut a substantially planar surface of the light emitting conduit 22. In some examples, a shroud or cap is included to direct light from the LEDs 66 into the light emitting conduit 22.

The inclusion of the push-through retainer 44 as a portion of the light emitting conduit 22 provides additional area for housing light sources, such as the LEDs 66. This can facilitate the use of multiple smaller LEDs to provide the same amount of light as a smaller number of larger LEDs. The LEDs 66 are approximately 3 Volt LEDs in this example.

The use of the smaller LEDs 66 can help to distribute thermal energy generated when the LEDs 66 are activated and can reduce the need to include the larger aluminum heat sinks associated with larger LEDs. The larger heat sink boards can cost more than the smaller heat sink boards, as known.

To ensure that light from the LEDs 66 is directed through the light emitting region 40 of the light emitting conduit 22 rather than, for example, leaking through the surfaces 76 of the push-through retainer 44, the surfaces 76 may incorporate molded-in or machined-in optics 80. These optics 80 can help to redirect light emitted from the LEDs 66 through the push-through retainer 44 and the neck portion 48 so that the light is emitted through the light emitting region 40 of the light emitting conduit 22.

Figure 7:
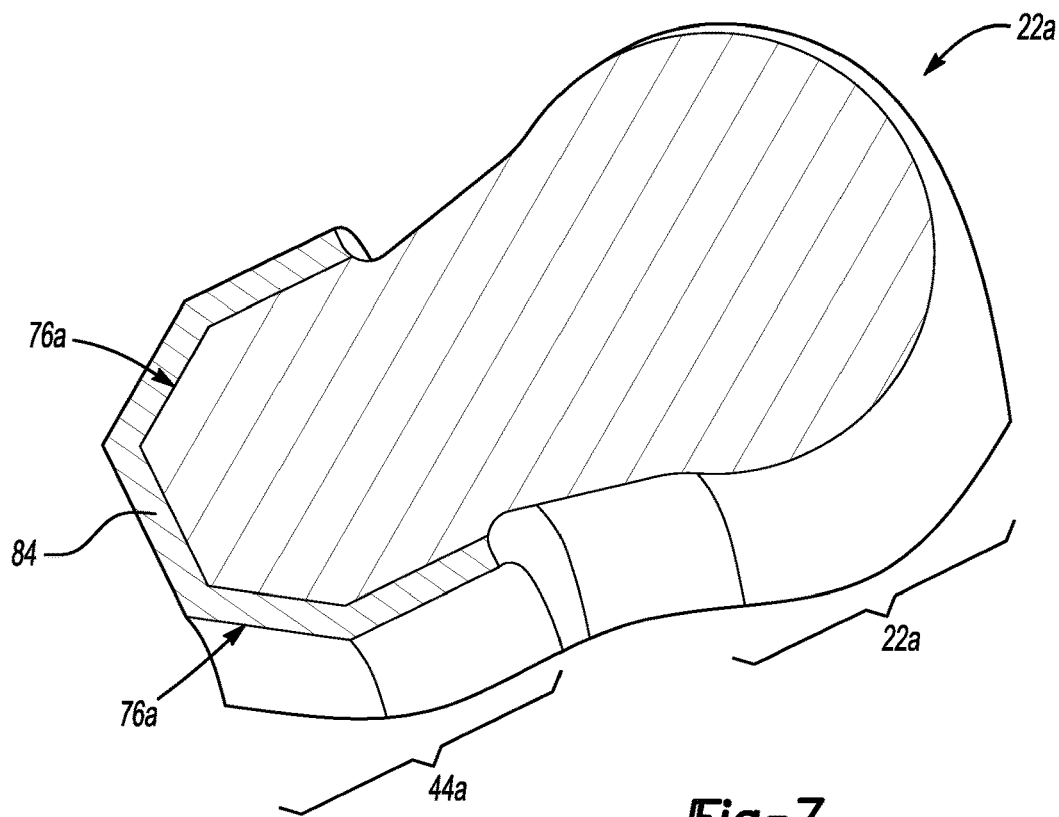
FIG. 7 illustrates a section view of a light emitting conduit according to another exemplary aspect of the present disclosure.

Referring to FIG. 7, in another example, a light emitting conduit 22a can be co-extruded with a layer 84 of reflective material disposed along the surfaces 76a of the push-through retainer 44a. The reflective material can be, for example, an opaque white acrylic that will block light leaking from the light emitting conduit 22a through the surfaces 86a of the push-through retainer 44a, and reflect light back toward the light emitting region 22a.

The reflective material, in a specific embodiment, can be a polymethyl methacrylate (PMMA) that has been colored with titanium dioxide ($TiO2$). Titanium dioxide has been shown to have a relatively high refractive index, which can be as high as 2.73. The percentage of titanium dioxide color added can be at least 10 percent to make the reflective material better able to redirect light to the light emitting region 40a of the light emitting conduit 22a.

Figure 8:
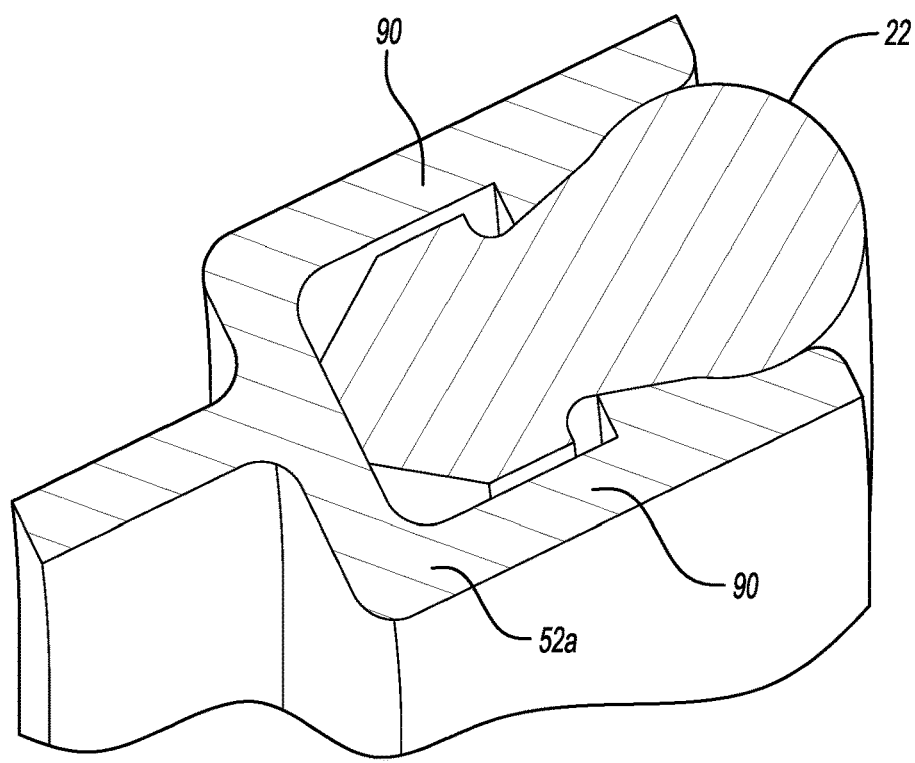
FIG. 8 illustrates the light emitting conduit of the FIGS. 3-6 embodiment secured to another type of vehicle structure.

With reference to FIG. 8, the light emitting conduit 22 can be secured to another type of vehicle structure 52a in another exemplary embodiment. The vehicle structure 52a includes flanges 90 that extend along opposing sides of the light emitting conduit 22. The vehicle structure 52a can be an extrusion and, in some examples, is included within a moon roof rail. If the vehicle does not require the light emitting conduit 22, the vehicle structure 52a can still be included, but the light emitting conduit 22 omitted. In so doing, the same moon roof rail can be used in vehicles that include the light emitting conduit 22 and those that do not.

Features of the disclosed examples include a light emitting conduit that incorporates retention features thereby lessening the need to rely on secondary attachment features, such as clips. The retention features of the light emitting conduit can provide additional area for holding light sources thereby enabling more small light sources to be used rather a greater number of larger light sources. The push-in retention feature of the light emitting conduit can include an added reflective layer configured to redirect light back through a light emitting region of the light emitting conduit.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A lighting system for a vehicle passenger compartment, comprising:
   a light emitting conduit disposed about at least a portion of an opening through a vehicle roof; and
   a push-through retainer of the light emitting conduit, the push-through retainer insertable through an aperture in a vehicle structure to hold the light emitting conduit relative to the vehicle structure, wherein the push-through retainer includes an enlarged head on a first side of a vehicle structure, the enlarged head directly connected to a light emitting region of the light emitting conduit by a neck portion that extends through the aperture in the vehicle structure.

2. The lighting system of claim 1, wherein the push-through retainer has an arrow-head cross-sectional profile.

3. The lighting system of claim 1, wherein the push-through retainer and remaining portions of the light emitting conduit are portions of a continuous, monolithic structure.

4. The lighting system of claim 1, further comprising at least one light source disposed at an end of the light emitting conduit.

5. The lighting system of claim 4, wherein the light emitting conduit extends longitudinally from a first end to an opposite, second end, wherein the at least one light source comprises a first group of light emitting diodes adjacent the first end, and a second group of light emitting diodes adjacent the second end.

6. The lighting system of claim 4, wherein the at least one light source comprises a plurality of light emitting diodes, wherein at least some of the light emitting diodes are positioned directly adjacent the push-through retainer on a first side of the vehicle structure, and at least some of the light emitting diodes are positioned directly adjacent a light emitting region on an opposite second side of the vehicle structure.

7. The lighting system of claim 4, further comprising a reflective optic that directs light emitted from the at least one light source from the push-through retainer and the neck to the light emitting region of the light emitting conduit.

8. The lighting system of claim 7, wherein the reflective optic is molded into the push-through retainer.

9. The lighting system of claim 7, wherein the reflective optic is a material that is separate from a material of the push-through retainer.

10. The lighting system of claim 4, further comprising a controller module governing operation of the at least one light source responsive to a position of at least one of a closure panel and shade movable over the opening in the vehicle roof.

11. The lighting system of claim 10, wherein the controller decreases an intensity of light directed into the light emitting conduit responsive to the shade being in an open position and the closure panel being in a closed position.

12. The lighting system of claim 10, wherein the controller increases an intensity of light directed into the light emitting conduit responsive to the shade and the closure panel being in an open position.

13. A lighting system for a vehicle passenger compartment, comprising:
   a vehicle roof having an opening;
   a retention flange adjacent the opening, the retention flange having a retention aperture;
   a light emitting conduit disposed about at least a portion of the opening, the light emitting conduit including a push-through retainer on a first side of the retention flange, a neck extending through the retention aperture, and a light emitting region on an opposite, second side of the retention flange; and
   a plurality of light sources disposed adjacent a longitudinal end portion of the light emitting conduit, wherein some of the light sources are positioned directly adjacent the push-through retainer on a first side of the retention flange, and at least some of the light sources are positioned directly adjacent a light emitting region on an opposite second side of the retention flange.

14. The lighting system of claim 13, further comprising a reflective optic that directs light emitted from at least some of the light sources from the push-through retainer and the neck to the light emitting region of the light emitting conduit.

15. The lighting system of claim 13, wherein the light emitting conduit extends from a driver side of the opening, along a forward side of the opening, to a passenger side of the opening.

16. The lighting system of claim 13, wherein the push-through retainer has an arrow-head cross-sectional profile.

17. A method of holding a lighting system for a vehicle passenger compartment comprising:
   holding a light emitting portion of a light emitting conduit against a first side of a retention flange of a vehicle using a push-through retainer that is disposed on an opposite, second side of the retention flange, the light emitting portion directly connected to the push-through retainer with a neck that extends through an aperture of the retention flange.

18. The method of claim 17, wherein the retention flange is adjacent an opening of a vehicle roof, and the light emitting portion is disposed about at least a portion of the opening.

* * * * *